United States Patent [19]

Byrns

[11] Patent Number: 4,611,713

[45] Date of Patent: Sep. 16, 1986

[54] SAW BLADE STORAGE COVER

[76] Inventor: James E. Byrns, 1027 2nd Ave. South, Clinton, Iowa 52732

[21] Appl. No.: 775,575

[22] Filed: Sep. 13, 1985

[51] Int. Cl.4 ............................................. A45C 11/26
[52] U.S. Cl. ....................................... 206/349; 220/23
[58] Field of Search ........................... 206/349; 220/23

[56] References Cited

U.S. PATENT DOCUMENTS

| 2,601,426 | 6/1952 | Baumann | 206/349 |
| 3,259,231 | 7/1966 | Romanowski et al. | 206/349 |
| 3,261,454 | 7/1966 | Elson et al. | 206/349 |
| 3,327,841 | 6/1967 | Schurman et al. | 206/349 |
| 3,933,243 | 1/1976 | Schurman | 206/349 |
| 4,340,139 | 7/1982 | Wilcox et al. | 206/349 |

FOREIGN PATENT DOCUMENTS

| 472248 | 3/1951 | Canada | 206/349 |
| 820419 | 7/1949 | Fed. Rep. of Germany | 206/349 |

Primary Examiner—Joseph Man-Fu Moy
Attorney, Agent, or Firm—Thomas J. Greer, Jr.

[57] ABSTRACT

A hinged cover, of double wall construction, for a container. The container base is configured to carry a portable saw. This invention resides in a cover construction which permits the storage of a spare rotary saw blade. The blade is stored in such a manner that irregular random or jostling motion of the closed container, such as rough transport of the container over a period of time, cannot result in the teeth of the stored saw blade piercing or damaging the exterior wall of the cover.

11 Claims, 4 Drawing Figures

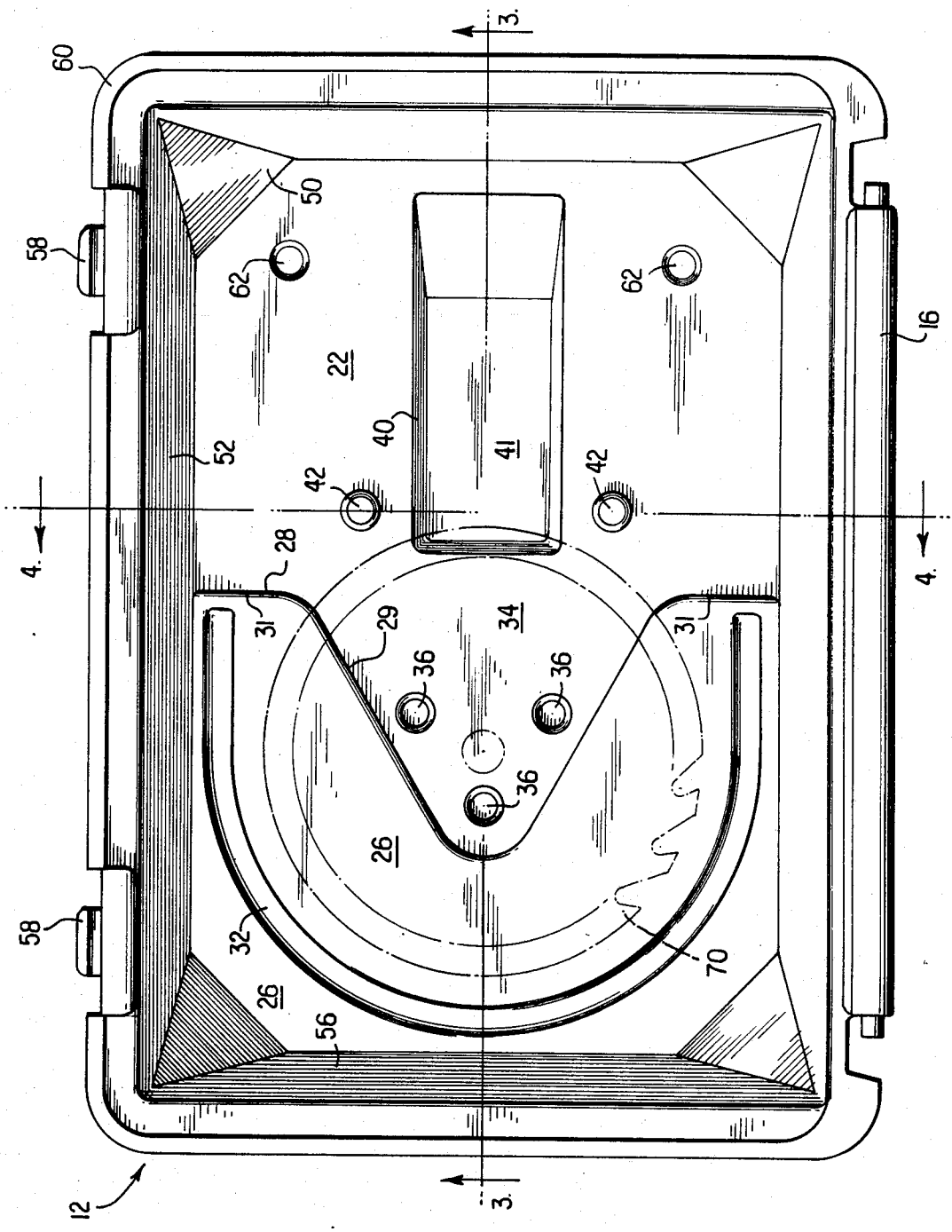

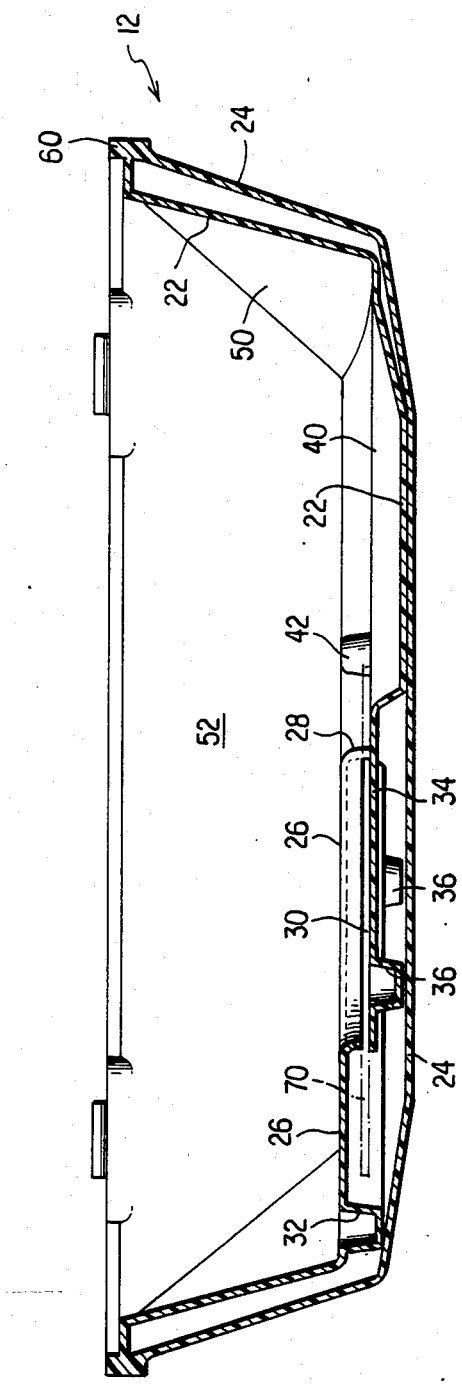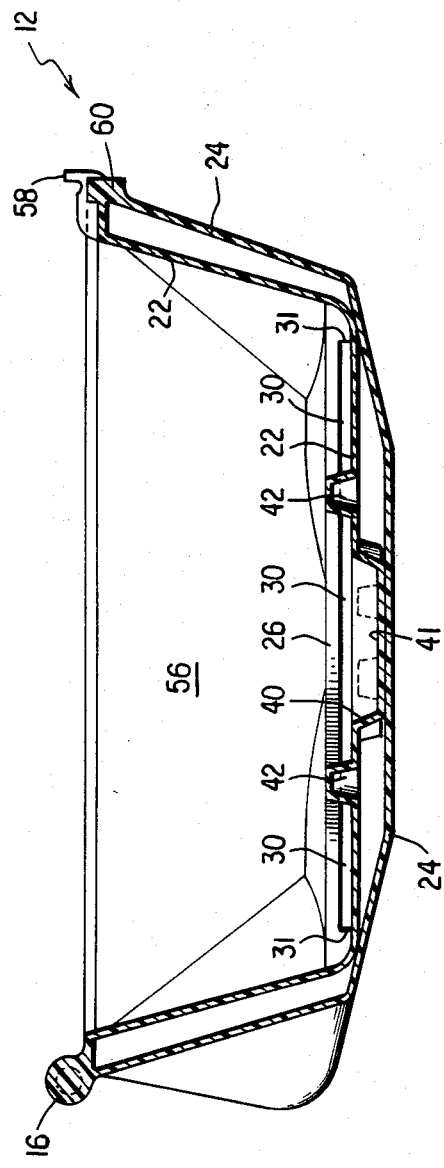

SAW BLADE STORAGE COVER

This invention relates to a container and more particularly to a container for carrying a portable tool, such as a rotary electric saw. The invention more specifically relates to a cover or top for the container, usually a hinged cover, wherein the cover is so configured as to hold a rotary saw blade. The saw blade may be that intended for use with the particular electric saw carried in the bottom of the container, or alternatively it may be a spare rotary saw blade.

According to the practice of this invention, the cover for the container is formed of a double wall construction, preferably of a plastics material. The innermost wall of the double wall construction is provided with a raised portion, of generally U-shape, with the inside legs of the U-shaped raised portion being provided with a slot a slit. The outermost boundary of the U-shaped raised portion is provided with a continuous curved depression to thereby form a trough. One interior surface of the trough functions as a first abutment or stop, to limit movement of the saw blade in at least on direction, preferably in three mutually perpendicular directions. The interior wall of the cover is further provided with a pair of upstanding dimples, integral with the wall, the dimples functioning as a second abutment to limit motion of the saw blade in an opposite direction, preferably a fourth direction. That portion of the innermost wall of the cover which extends towards the bight portion of the generally U-shaped raised portion, and extends between the legs of the U, defines a resilient saw blade support platform and is provided with three integral pintles or projections, these projections being slightly spaced from the innermost surface of the outer wall of the double wall cover. The bottom of the mentioned trough abuts the inner surface of the outermost wall of the double wall cover. A pair of pintles may also be placed integrally on the inner wall of the double wall construction to assist in spacing the two walls together. The innermost wall is further provided with a generally rectangular depression. The purpose of the depression is to permit the insertion of fingers beneath the saw blade to thereby pull a peripheral portion of the blade away from the two pintle abutments and thereby permit removal of the saw blade from its stored position within the U-shaped portion.

By virtue of this construction, a slightly flexible platform which supports the blade or blades is formed. The saw blade is free to move between the mentioned trough (first abutment) and the (second) abutment pintles. In no situation is the blade thus permitted to touch the inside of the outer wall of the cover. The outer wall of the cover cannot, with time and usage in carrying of the case, be cut or scratched by the teeth of the stored blade which might thereby result in breaking through the outer cover wall. While shown as carrying a single saw blade in stored position, it will be understood that more than one saw blade may be stored.

For removing and inserting the blade or blades, the blade is moved over the abutment pintles and pushed into the slot. The flexibility of the platform permits this slight angle of entry or of removal. A slight rotation of the blade will permit easier entry or removal.

IN THE DRAWINGS

FIG. 1 is a perspective view of a complete carrying case with an electric rotary saw therein, the case including the pivoted saw holder storage cover of this invention.

FIG. 2 is a plan view looking toward the inside of the cover shown at FIG. 1.

FIG. 3 is a view taken along section 3—3 of FIG 2.

FIG. 4 is a view taken along section 4—4 of FIG. 2.

Referring now to FIG. 1 of the drawings, the numeral 10 denotes generally a carrying case for a portable rotary electric saw, the carrying case being denoted generally by the numeral 10. The numeral 12 denotes the cover for case while numeral 14 denotes the lower portion or base of the container, with hinge 16 joining cover 12 and lower portion 14. The numeral 18 denotes generally a typical portable electric rotary saw. The numeral 70 denotes a saw blade stored and held in the cover 12, the construction of cover 12 generally defining this invention.

Referring now to FIG. 2 of the drawings, the cover 12 is shown as it is viewed when looking towards its interior, with the cover 12 detached from the lower portion 14 of the container 10 shown at FIG. 1. In the following description, the reader will have reference also to FIGS. 3 and 4.

The numeral 22 denotes the inner wall while the numeral 24 denotes the outer wall of cover 12, the walls and cover formed from a plastics material. The reader will observe, by reference to FIGS. 3 and 4, that these walls are spaced apart near the edge portions of the container and yet touch each other at several locations, as will more particularly be described. The numeral 26 denotes a raised U-shaped portion, integral with inner wall 12, the U portion being raised relative to the remainder of inner wall 22, as viewed at FIGS. 3 and 4. The numeral 28 denotes the rim of the raised portion, the rim including leg portions 29, which form a generally V-shape as viewed at FIG. 2. The numeral 30 denotes a slot beneath rim 28, the slot extending from its edge termini 31 continuously inwardly towards the longitudinal axis of the cover (section line 3—3) as shown at FIG. 2. The extent of slot 30 also may be seen by reference to FIG. 4. Slot 30 is formed in a wall portion connecting the right portion of wall 22, as viewed in FIG. 2, to the raised U portion 26 in the region of rim 28. The numeral 32 denotes a trough integrally formed from raised portion 26, the trough being of generally U-shape in transverse cross-section and its bottom abutting outer wall 24 of cover 12. Trough 30 defines a first abutment for the saw blade. The numeral 34 denotes a platform and is an integral portion of inner wall 22. Platform 34 carries integrally molded and downwardly extending pintles or depressions 36 which are spaced slightly from the outer wall 24 of cover 12, as may be seen by reference to FIG. 3. Platform 30 defines a slightly resilient support for the saw blade.

The numeral 40 denotes a generally rectangular depression in inner wall 22, with numeral 41 denoting the bottommost portion of this depression. As may be seen by reference to FIG. 4, wall 41 contacts outer wall 24 of container 12. The numeral 42 denotes a pair of integral and upwardly extending pintles, defining a second saw blade abutment, these being located, respectively, on opposite sides of the longitudinal axis of cover 12 as viewed in FIG. 2, this longitudinal axis coinciding with section axis 3—3.

The numeral 50 denotes generally triangular fillet portions of the interior of container 12, at its four interior corners, while the numeral 52 denotes the longitudinally extending side walls and the numeral 56 denoting the edge walls of the cover. The numeral 58 denotes either of two latch members, integrally formed for example, with peripheral edge portion 60 of the cover. The numeral 62 denotes integral pintles on wall 22 to assist in spacing the latter from wall 24.

The mode of operation of the invention will now be explained. A saw blade is inserted into slot 30 by passing it over abutments 42, the plane of the blade being very nearly parallel to the bottom of the cover as viewed at FIG. 3, with the diameter of the blade being less than the transverse extent of slot 30, i.e., less than the distance between termini 31 of slot 30, as may be seen by reference to FIG. 2. Continued movement of the saw blade from right to left, as viewed at FIG. 2 or 3, results in a slight downward movement of resilient platform 34, with the motion of the saw blade continuing until the blade is past abutments 42. The reader will observe that when in the position shown at FIG. 2, the saw blade cannot move toward the left to an extent greater than one wall of trough 32. With the saw blade now level and parallel with resilient platform 34, the blade cannot move to the right, as viewed at FIG. 2, by an amount greater than the location of abutments 42. Platform 34 constrains the position of the saw blade towards the outer wall 22, while the upper surface of slot 30, as viewed at FIG. 3, constrains the motion of the saw blade in that direction. The saw blade is thus in a pocket.

The reader will now readily visualize that, in the location indicated at FIGS. 1, 2 and 3, saw blade 70 cannot touch the outer wall 24 of the cover, and accordingly the teeth of the blade cannot, with continued carrying and jostling of the case, result in a cutting through of outer wall 24.

The remove the blade 70 from its indicated position, the user places some of his/her fingers down into rectangular slot 40, with a pair of fingers, for example, engaging the underside periphery of the saw blade and with the thumb engaging the upper surface of the saw blade, as viewed at FIG. 2. This grasped portion of the saw blade is now tilted upwardly, with resilient platform 34 being pushed downwardly somewhat by this tilting action, with the blade being now slid over abutments 42, with the motion continuing until the saw blade is completely out from the confines of generally U-shaped raised portion 26 and the upper portion of slot 30. The blade is now free and may be attached or otherwise used.

Typically the cover is made by blow molding a plastics material such as polyethylene.

I claim:

1. A cover for a container, the cover storing a rotary saw blade therein, the cover adapted to close the top of the container, the container adapted to carry a portable, rotary saw such as an electric saw, the cover being of a double wall construction, the inner wall of the cover having a flexible, projecting platform, a raised portion of the inner wall extending beyond the platform, a slot located at the junction of the periphery of the platform adjacent said raised portion of the inner wall, said raised portion carrying first abutment means for limiting the movement of the saw blade in at least one direction, second abutment means carried by the inner wall for limiting the movement of the saw blade in an opposite direction from said at least one direction, a portion of said platform being in surface to surface opposing relation with one surface portion of the saw blade, whereby the resiliency of the platform and the first and second abutments maintain the saw blade in stored position between the abutments and prevent the teeth of the saw blade from coming into contact with the outer wall of the cover during transport of the container.

2. The cover of claim 1 wherein said raised portion of the inner wall is generally U-shape and wherein the major portion of the length of the slot is generally V-shape, in inner plane view of the cover.

3. The cover of claim 2 wherein said first abutment means is defined by a trough formed in said U raised portion, the saw blade positioned within the legs and bight portion of the U.

4. The cover of claim 2 wherein said second abutment means is defined by a pair of raised pintles on the inner wall, the pintles positioned beyond the periphery of the saw blade.

5. The cover of claim 2 wherein the inner wall is provided with a depression below the plane of the saw blade, whereby a peripheral portion of the saw blade may be grasped to withdraw it from its stored position in the cover, one portion of the depression being adjacent a peripheral portion of the saw blade.

6. The cover of claim 2 wherein the platform is resiliently bendable toward the outer cover wall.

7. The cover of claim 6 wherein the platform carries pintles which extend toward, but are spaced from, the outer cover wall.

8. The cover of claim 5 wherein the bottom of the depression is in contact with the outer wall.

9. The cover of claim 1 wherein the cover is formed from a plastics material.

10. The cover of claim 9 wherein the plastics material is polyethylene.

11. The cover of claim 10 wherein the cover is made by blow molding.

* * * * *